United States Patent
Trojahner

(10) Patent No.: US 10,048,951 B2
(45) Date of Patent: Aug. 14, 2018

(54) METHOD FOR TYPE CHECKING AND TRANSFORMATION OF A COMPUTER PROGRAM WITH FIRST-CLASS STATIC FUNCTIONS

(71) Applicant: Dassault Systèmes 3DExcite GmbH, München (DE)

(72) Inventor: Kai Trojahner, München (DE)

(73) Assignee: Dassault Systèmes 3DExcite GmbH, München (DE)

( * ) Notice: Subject to any disclaimer, the term of this patent is extended or adjusted under 35 U.S.C. 154(b) by 0 days.

(21) Appl. No.: 14/782,169

(22) PCT Filed: Mar. 21, 2014

(86) PCT No.: PCT/EP2014/055751
§ 371 (c)(1),
(2) Date: Dec. 15, 2015

(87) PCT Pub. No.: WO2014/161731
PCT Pub. Date: Oct. 9, 2014

(65) Prior Publication Data
US 2016/0124727 A1 May 5, 2016

(30) Foreign Application Priority Data

Apr. 3, 2013 (EP) .................................. 13162073

(51) Int. Cl.
G06F 9/45 (2006.01)
G06F 8/41 (2018.01)

(52) U.S. Cl.
CPC ............... *G06F 8/437* (2013.01); *G06F 8/49* (2013.01)

(58) Field of Classification Search
CPC .............................................. G06F 8/00–8/78
See application file for complete search history.

(56) References Cited

U.S. PATENT DOCUMENTS 5,579,518 A * 11/1996 Yasumatsu ............ G06F 9/4431
712/E9.085
5,742,828 A * 4/1998 Canady ................... G06F 8/425
717/144

(Continued)

OTHER PUBLICATIONS

Dawson et al., Jan. 1996. "C: a language for high-level, efficient, and machine-independent dynamic code generation". In Proceedings of the 23rd ACM SIGPLAN-SIGACT symposium on Principles of programming languages (POPL '96). ACM, New York, NY, USA, p. 131-144.*

(Continued)

*Primary Examiner* — Chameli Das
*Assistant Examiner* — Joanne Macasiano
(74) *Attorney, Agent, or Firm* — Entralta P.C.; Justin G. Sanders; Peter D. Weinstein

(57) ABSTRACT

The invention relates to a method for checking and/or transformation of a computer program present in a programming language which supports first-class functions and in which a type check of the program or of at least a part of the program is performed in order to assign a type to each expression of the program or part of the program, the type consisting of a base type and a binding time. The set of base types comprises at least base types for describing simple values and a function type for describing functions, and the set of binding times comprises at least one static binding time and one dynamic binding time, and a function type is only accepted during the type check together with the static binding time.

16 Claims, 2 Drawing Sheets

(56) References Cited

U.S. PATENT DOCUMENTS

Figure 1:
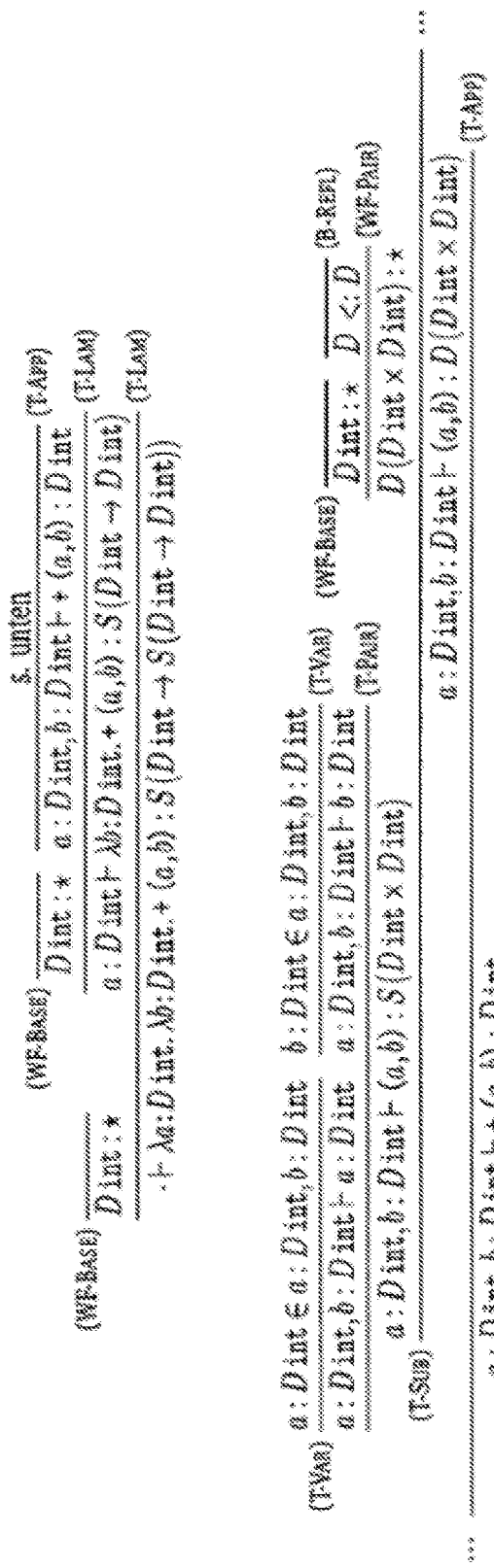

| | | | | |
|---|---|---|---|---|
| 2002/0194579 | A1* | 12/2002 | Dollin | G06F 9/44589 |
| | | | | 717/126 |
| 2004/0139422 | A1* | 7/2004 | Vion-Dury | G06F 8/425 |
| | | | | 717/114 |
| 2004/0194058 | A1* | 9/2004 | Meijer | G06F 8/437 |
| | | | | 717/116 |
| 2008/0059956 | A1* | 3/2008 | Su | G06F 8/41 |
| | | | | 717/140 |
| 2010/0169868 | A1* | 7/2010 | Condit | G06F 8/437 |
| | | | | 717/136 |
| 2010/0299660 | A1* | 11/2010 | Torgersen | G06F 9/44521 |
| | | | | 717/148 |
| 2013/0283248 | A1* | 10/2013 | Abadi | G06F 8/76 |
| | | | | 717/136 |

OTHER PUBLICATIONS

Neil D. Jones. Sep. 1996. "An introduction to partial evaluation". ACM Comput. Surv. 28, 3 (Sep. 1996), p. 480-503.*

Kai Trojahner: "Shading Language with Static First-Class Functions", Realtime Technology AG, Aug. 31, 2012.

Monnier S et al: "Inlining as staged computation", Journal of Functional Programming, vol. 13, No. 3, May 2003, pp. 647-676, XP009172119.

Neil Mitchell et al: "Losing functions without gaining data", Proceedings of the 2nd ACM SIGPLAN Symposium on Haskell, Haskell '09, Jan. 2009, pp. 13-24, XP055076895.

Gustavo Arroyo et al: "A Transformational Approach to Polyvariant BTA of Higher-Order Functional Programs", Jul. 17, 2008, Logic-Based Program Synthesis and Transformation, Springer Berln Heidelberg, Berlin Heidelberg, pp. 40-54, XP019115207.

Dirk Dussart et al: "Polymorphic recursion and subtype qualifications: Polymorphic binding-time analysis in polynomial time", Sep. 25, 1995, Static Analysis, Springer Berlin Heidelberg, Berlin, Heidelberg, pp. 118-135, XP019179076.

Peter Thiemann: "A unified framework for binding-time analysis", In: "TAPSOFT '97: Theory and Practice of Jan. 1997", Springer Verlag, Berlin/Heidelberg, XP055076900, vol. 1214, pp. 742-756.

* cited by examiner $$\text{(WF-Base)}\ \dfrac{}{Dint::*}$$

$$\text{(WF-Base)}\ \dfrac{Dint::*}{f:S(Dint\to S(Dint\to Dint))}$$

$$\text{(T-Var)}\ \dfrac{f:S(Dint\to S(Dint\to Dint))\in\Gamma}{\Gamma\vdash f:S(Dint\to S(Dint\to Dint))}\qquad \text{(T-Var)}\ \dfrac{a:Dint\in\Gamma}{\Gamma\vdash a:Dint}$$

$$\text{(T-App)}\ \dfrac{\Gamma\vdash f\,a:S(Dint\to Dint)}{}\qquad \text{(T-Var)}\ \dfrac{b:Dint\in\Gamma}{\Gamma\vdash b:Dint}$$

$$\text{(T-App)}\ \dfrac{\Gamma\vdash (f\,a)\,b:Dint}{}$$

$$\text{(T-Lam)}\ \dfrac{f:S(Dint\to S(Dint\to Dint)),a:Dint\vdash \lambda b:Dint.(f\,a)\,b:S(Dint\to Dint)}{}$$

$$\text{(T-Lam)}\ \dfrac{f:S(Dint\to S(Dint\to Dint))\vdash \lambda a:Dint.\lambda b:Dint.(f\,a)\,b:S(Dint\to S(Dint\to Dint))}{}$$

$$\text{(T-Lam)}\ \dfrac{}{\vdash \lambda a:Dint.\lambda b:Dint.(f\,a)\,b:S(S(Dint\to S(Dint\to Dint))\to S(Dint\to S(Dint\to Dint)))}$$

*Fig. 2*

METHOD FOR TYPE CHECKING AND TRANSFORMATION OF A COMPUTER PROGRAM WITH FIRST-CLASS STATIC FUNCTIONS

This application is a 35 U.S.C. § 371 US national stage entry of International Application number PCT/EP2014/055751, filed Mar. 21, 2014, and claims priority and is entitled to the filing date of EP application number 13162073.4, filed on Apr. 3, 2013. The contents of the aforementioned applications are incorporated by reference herein.

The invention relates to a method for checking and/or transforming a computer program which is present in a programming language which supports first-class functions.

Computer programs serve for the control of the hardware in computer systems or calculator systems and for resolving problems using the computer systems. Computer programs are designed by a programmer, typically at a higher level, e.g. in a higher programming language, and are subsequently translated into a machine code which can be directly interpreted or executed by the hardware.

An important area of application of computer systems is the field of computer graphics, i.e. the generation or "rendering" of data for representing graphics, in particular three-dimensional graphics, using computer systems or using graphics processors specifically adapted to these applications.

When designing programs for these applications, a compromise always has to be made between the image quality of the graphics and the rendering speed, with the corresponding priorities varying greatly with the respective area of application. Whereas rendering times of several hours are e.g. acceptable in the generation of offline content for generating graphics which are as close to reality as possible, a real-time visualization requires that a plurality of images per second are generated with the best quality which can be achieved in the available time frame. These competing objectives have resulted in the development of a plurality of different rendering algorithms which all realize an individual compromise between the visualization quality and the rendering speed. In addition, the above objectives have resulted in the development of a plurality of parallel hardware models and programming models which are directed to fast 3D rendering.

Shader programs which are responsible for the representation of shades on the surfaces of geometrical objects, in particular three-dimensional geometrical objects, with the representation depending on a respective assumed incidence of light and on the surface material, have a particular importance for a realistic visualization in computer graphics software. These shader programs can have a high complexity and are carried out many times within the frame of a rendering process and are thus typically decisive for the achievable rendering time of the graphics software. The development of new shader programs or "shaders" from scratch for every possible combination and configuration of rendering procedures and hardware platforms is associated with a high economic effort. It is therefore desirable to design shader programs in a shader programming language which, unlike programming languages specific to hardware platforms, is not tied to any very specific hardware. Large amounts of computer programming code could be reused for different renderer implementations by modulizing the shader programs into code fragments which are specific to a specific hardware platform or to a specific rendering procedure, on the one hand, and into code fragments which are independent thereof, on the other hand, whereby the effort for the development of shader programs or rendering programs would be reduced and the productivity of the software development would be increased.

A particularly effective and simultaneously simple mechanism for modulizing programs is represented by higher order functions. A function is called a higher order function or "functional" when it adopts one or more functions as an argument or delivers one or more functions as a return value. Other functions are called first-order functions. A programming language which supports higher order functions must support so-called first-class functions, i.e. the language must treat functions in the same way as other values. A first-class function can e.g. be forwarded to a higher order function as an argument, can be delivered to a higher order function as a return value, can be associated with a variable as a value or can be used in a data structure as an element.

Despite the potential of first-class functions for simplifying the program design, previous shader languages have not supported first-class functions because their implementation generally requires the support of function pointers and a dynamic memory allocation to be able to allocated the environment or "closure" of a function with the non-local values referenced by the function. These implementation techniques result in additional instructions and consequently in an extension of the run time which may substantially impair the achievable rendering performance since shader programs are typically executed millions of times per second. The largest part of the run time extension is caused by the dynamic memory allocation, but the dereferencing of function points can also result in a futile access to the command cache memory ("cache miss") and thus in a noticeable time loss. Furthermore, a number of rendering platforms such as CUDA 1.x, OpenCL or GLSL do not support either function pointers or dynamic memory allocation.

It is the object of the invention to provide a method which makes it possible to check computer programs using first-class functions as to whether the respective program can be transformed into an equivalent program identical with respect to its function which has no higher order functions or no first-class functions and can thus in particular also be executed with a high rendering performance on hardware which does not provide any support for function pointers and/or dynamic memory allocation. The check should be able to be carried out with a small time effort and optionally allow an exact indication of the program element due to which the program cannot be transformed. A transformable program should be correspondingly transformed and then, optionally after translation into a corresponding machine code, be executed on the respective hardware.

The object is satisfied by a method having the features of claim 1.

Claim 1 describes a method for checking and/or transforming a computer program which is present in a programming language which supports first-class functions. A type check of the program or of at least a part of the program is carried out to allocate a type to each expression of the program or part of the program, with the type comprising a fundamental type and a binding time, wherein the set of the fundamental types comprises at least base types for describing simple values and a functional type for describing functions and the set of binding times comprises at least one static binding time and one dynamic binding time. In accordance with the invention, a functional type is only accepted together with the static binding time during the type check.

It has been recognized within the framework of the invention that a computer program which is present in a programming language which supports first-class functions can be transformed by partial evaluation into a program without first-class functions when all expressions to which a functional type is allocated have a static binding time, i.e. the respective expression can already be evaluated before the execution of the program, i.e. at the time of the compiling. On the other hand, an expression which has a dynamic binding time cannot be assumed as statically known, but can rather only be evaluated at the run time of the program and can thus not be eliminated by partial evaluation before the execution. This is explained in the following using two different, exemplary program codes which are noted in a hypothetical dialect of the programming language C.

Program code 1:

```
int apply( ((int, int) => int) f, int a, int b) {
  return f(a,b);
}
int add( int a, int b) { return a + b; }
int sub( int a, int b) { return a - b; }
int foo( bool p, int a, int b) {
  int r;
  if (p) {
    r = apply( add, a, b);
  } else {
    r = apply( sub, a, b);
  }
  return r;
}
```

The function in program code 1 is apply a higher order function. The apply function accepts a function f as an argument which maps two integer values onto a further integer value, as is reflected in the programming code by the annotated functional types "(int,int)→int". The apply function applies f to the two further integer arguments a, b and returns the result. The foo function uses the apply function either to add or to subtract two integer values in dependence on the value of the Boolean argument p.

The higher order program in accordance with program code 1 can be transformed by partial evaluation at the compiling time into an equivalent first-order program, i.e. without first-class functions. Such a transformed program is shown in the following as program code 2. In program code 2, the calls of the apply function are each replaced with the body of the apply function so that the functions add and sub, which are first-order, are called directly. The replacement of the function calls is also called inlining or expanding.

Program code 2:

```
int add( int a, int b) { return a + b; }
int sub( int a, int b) { return a - b; }
int foo( bool p, int a, int b) {
  int r;
  if (p) {
    r = add( a, b);   // apply( add, a, b)
  } else {
    r = sub( a, b);   // apply( sub, a, b)
  }
  return r;
}
```

In principle, however, not all computer programs having first-class functions can be transformed by an expansion as described above into an equivalent first-order program, such as is shown by the following program code 3 which represents an alternative definition of the foo function.

Program code 3:

```
int foo( bool p, int a, int b) {
  ((int,int) => int) f;
  if (p) {
    f = add;
  } else {
    f = sub;
  }
  return apply(f,a,b);
}
```

Program code 3 declares an identifier or a variable f which represents a function, and indeed either the add function or the sub function, depending on the value of the Boolean argument p of the foo function. The definition of the apply function can admittedly formally be used by the compiler by inlining so that the call of the apply function in program code 3 adopts the form f(a,b). Since the value of f, however, depends on the value of the variable p, neither add nor sub can be applied directly when the value of p is not statically known, which is the case, for example when the foo function is a so-called starter function of a program at which the program execution starts.

The above program codes 1 to 3 illustrate that specific programs having first-class functions can be transformed by partial evaluation into equivalent first-order programs, i.e. programs without first-class functions, and other programs cannot. Only when functions are statically known in the program can the program be transformed by evaluation into a first-order program. Since the method in accordance with the present invention carries out a type check which associates both a fundamental type and a binding time to the expressions of the program and a functional type is only accepted during the type check together with the static binding time does the method consequently determines whether the program can be transformed by partial evaluation into a first-order program, i.e. without first-class functions. This is specifically illustrated for program code 1 in "Example 1" which follows the following general description and which describes a check procedure carried out on this specific program in detail.

Since the check and classification in accordance with the invention are based on a type check, this can take place without an evaluation of the program. Type checks are known per se and are based on a set of typification rules specific to the respective language which together define a type system and which classify the expressions of a program according to the type of values they calculate. The typification ability of all expressions of a program or of a program part by a successful application of the typification rules determines whether the program or the program part is admissible or not.

The invention extends the known type check in that both a fundamental type which describes the value of the expression and a binding time which describes the time of the evaluation of the expression are associated with each expression. The type system is designed specifically for a two-stage evaluation of the program which comprises a static partial evaluation of the program, i.e. one taking place at the time of translation, and a subsequent dynamic residual evaluation of the program, i.e. one which takes place at the run time. The type system differentiates in this respect by expressions having a static binding time, i.e. expressions which can only be partially evaluated at the time of translation, on the one hand, and expressions having a dynamic binding time, i.e. expressions which can only be evaluated at the run time on the other hand, and in this respect selectively allows the formulation of programs which can be transformed by the static partial evaluation into programs without first-class functions.

It can be determined in a particularly simple manner and without a prior evaluation of the total computer program by the combined typification by fundamental types and binding times whether the program can be transformed into an equivalent first-order program or not. It can be ensured with a small effort in this respect that at least all those programs are rejected which contain first-class functions and in which the described transformation is not possible.

During the type check, each expression is checked per se using the typification rules so that when a type error occurs in the program, the point in the program at which the error occurs can be determined. An exact indication of the "erroneous" or invalid program element and a corresponding error message to the user are thus possible, whereby the error elimination is substantially facilitated for the programmer.

The accompanying drawings illustrate aspects of the present invention. In such drawings:

FIGS. 1 and 2 are diagrams of portions of an exemplary rule application, in accordance with at least one embodiment.

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments.

It is made possible for the programmer by the method to program a program such as a shader program in a simple manner using first-class functions which can be transformed into an equivalent first-order program. To ensure the transformability, static first-class functions are accepted in this respect and dynamic first-class functions are not accepted. Due to the direct and specific acceptance of static first-class functions, the modular development of programs is made possible which can all be transformed into first-order programs which can be executed in a short run time independently of the hardware platform executing the software. A higher effective performance of the computer, for example in the rendering of 3D visualizations, is thus ensured.

Advantageous embodiments of the invention are described in the dependent claims, in the description and in the Figures.

When reference is made to a program in the present description, the corresponding description can also relate to a program part unless otherwise stated.

The type check serves to associate a type with each expression of the program using predefined typification rules. The type check can comprise the application of a plurality of typification rules defining a type system, wherein different rules are provided for different types of expressions. The typification rules allocate types to the expressions of the program which, on the one hand, comprise the fundamental types and additionally the binding time of the respective expression. When reference is made in the present description to a "type", the type formed by the fundamental type and by the binding time is accordingly meant by it. When reference is made to a fundamental type, e.g. to a functional type or base type, "having" a static or a dynamic binding time or a "static" or "dynamic" fundamental type, a type is meant by this which has the respective fundamental type and the respective binding time. Equally, when reference is made to a type "having" a fundamental type, e.g. "having" a functional type, a type is meant which comprises the binding time and the fundamental type and whose fundamental type is given by the respective fundamental type.

The typification rules of the type system preferably comprise type association rules which reflect the pre-conditions under which a specific type is associated with an expression of a specific kind. The rules furthermore preferably comprise well-formedness rules which reflect the pre-conditions under which a type is assumed to be well-formed or well-shaped and may accordingly be used. In addition, sub-typification rules can be provided which reflect the conditions under which a specific type is assumed as a sub-type of another type. Such type systems are known per se and are described, for example, in "Types and Programming Languages" by Benjamin C. Pierce, MIT Press, 2002.

In accordance with an embodiment, an error message is output when it is found during the type check that no type can be associated with an expression. This is in particular the case when a typification rule or a type association rule cannot be successfully applied to the respective expression because the expression does not satisfy the requirements predefined by the typification rules. The error message preferably indicates the expression or subexpression which cannot be typed. In this manner, the error and also the exact cause or point in the program code which causes the error can be advised to a programmer so that the error can be easily remedied by a corresponding change of the program code.

An error message is preferably output when an expression having a functional type is output as a possible result of a dynamic case distinction. A case distinction comprises a condition on which the result of the case distinction depends and e.g. comprises an if-else statement. In a dynamic case distinction, the result of the case distinction is not statically known, but only at the run time, e.g. when the expression representing the condition has a dynamic binding time and it is thus not statically known whether the condition is satisfied or not or whether the expression representing the condition is true or false. If now respective expressions having a functional type are indicated as possible results of such a dynamic case distinction, e.g. in the branches of an if-else statement, a function would result from the case distinction which is not statically known and can thus not be eliminated by a partial evaluation of the program before the run time. This is indicated by the error message.

An expression is preferably also understood under an expression having a functional type within the framework of the above-described embodiment which has a fundamental type assembled from one or more types, wherein at least one of the types from which the fundamental type is assembled, has a functional type as the fundamental type. Such a type is also called a type "containing" a functional type here. Assembled fundamental types are described in more detail in the following.

Before looking at further advantageous embodiments, for better understanding, the syntax of an exemplary programming language is given in the following in an extended Backus-Naur form (EBNF) which formalizes relevant expressions of the programming language for the present description. The syntax used here corresponds to a simply typed $\lambda$ calculus with additional binding time annotations. This language core can optionally be extended by one or more further language elements, i.e. binding times, fundamental types and/or expressions.

TABLE 1

(formalized syntax):

| T | ::= | M C | Types |
|---|---|---|---|
| M | ::= | S \| D | Binding times |
| C | ::= | B \| T → T \| T × T | Fundamental types |
| B | ::= | ... | Base types |
| e | ::= | c \| x \| λx:T.e \| e e | Expressions |
|   |     | \| (e,e) \| fst e \| snd e |  |
|   |     | \| if e then e else e |  |
| c | ::= | ... | Constant symbols |
| υ | ::= | c \| λx:T.e \| (υ,υ) | Values |
| Γ | ::= | · \| Γ,x : T | Contexts |

Each type T associates a fundamental type C with a binding time M. The binding time M is either static S or dynamic D. The set of the fundamental types C comprises base types B which are not indicated in the above table. The base types B describe simple values and can at least comprise a respective base type for whole-number numerical values (base type: "int") and Boolean values (base type: "bool"). The set of the fundamental types C additionally compromises functional types $T_1 \rightarrow T_2$ and pair types $T_1 \times T_2$, where a function type $T_1 \rightarrow T_2$ describes a function which maps an argument of the type $T_1$ (also called a definition type) onto a value of the type $T_2$, and where a pair type $T_1 \times T_2$ describes a pair of values which each have a value of the type $T_1$ or $T_2$.

Fundamental types C which indicate one or more types $T_1$, $T_2$, i.e. in Table 1 the functional type $T_1 \rightarrow T_2$ and the pair type $T_1 \times T_2$, will also be called assembled fundamental types in the following. Types having an assembled fundamental type as the fundamental type will accordingly be called assembled types.

The syntax of the expressions e given in Table 1 comprises standard language elements. They include constant symbols c which are not specified in any more detail in the syntax given in Table 1 and can, for example, comprise operators such as plus (+), minus (−), logical and (and), logical or (or), logical not (not), equals (=), smaller than (<) and larger than (>). The expressions e furthermore comprise variables x and functions or functional definitions which are represented by the symbol sequence □x:T.e.□ symbolizes that it is a functional definition which is also called a □ abstraction. The symbol sequence x:T defines the variable x as a variable of the function for which the type T has e.g. explicitly been annotated as a type by the user. The symbol e symbolizes the body of the function. The expression syntax furthermore comprises applications $e_1$ $e_2$ which represent the application of a function $e_1$ on an argument $e_2$, pair constructors $(e_1, e_2)$ which define a pair, projections fst e, snd e which project the first or second elements of the pair e, and conditional expressions if $e_p$ then e else e' with the known meaning. The set of the values v comprises the constant symbols c, functions or abstractions □x:T.e and pairs of values (v, v).

A type checking context Γ which is also simply called a context is a list of pairs which associate a respective type to the variables x of the program. The symbol sequence x:T means that the type T has been associated with the variable x. A dot • designates the blank context. For reasons of simplicity, it is assumed in the following in connection with the specific definition of the typification rules that all the bound variables and the free variables of the program have different designators or names. The respective description can also be applied to programs in which this is not the case since the above condition can always be ensured by redesignating variables which are of the same designation, but are different.

A program preferably represents exactly one expression in the programming language used which in particular uses a λ syntax or can be represented therein. An expression typically comprises a plurality of sub-expressions which can in turn contain expressions. The application of the type association rules to an expression requires that the sub-expressions are first typed recursively until the total expression is typified or the type check produces a type error.

In accordance with an advantageous embodiment, an error message is output when it is found during the type check that a functional type $T_1 \rightarrow T_2$ which does not have any static binding time S is annotated in the program or in the part of the program. The type annotation can e.g. be of the kind x:T and serves for the fixing of the type T of a functional variable x in a functional definition λx:T.e. The type annotation is preferably carried out manually by the programmer in the formulating of the program. It is ensured by the above measure that only valid functional types, i.e. functional types having a static binding time, are accepted in such type annotations.

An explicit type annotation makes it possible to check an expression which defines a function, independently of the remaining expressions of the program and in particular independently of an operand to which the function may be applied, with respect to its type and its validity. A check is made for this purpose as to whether the annotated type of the functional variable is itself valid and whether the body of the function is valid for the functional variable under the requirement of the annotated type.

It is a general advantage of the method described herein that individual expressions or program parts can be checked with respect to their types independently of the remaining expressions or program parts, i.e. without all the remaining program parts and thus the total program having to be present simultaneously. Instead it is in any case sufficient for the type check of an expression if only the types of the remaining expressions or program parts are known at the time of the check. A modular programming and check is thus made possible, which substantially facilitates the preparation of valid programs.

It can in each case be checked separately due to the explicit type annotation and can be advised to the user in the event of an error whether an invalid type has been annotated, i.e. the function was defined under the requirement of an erroneous type, whether the body of the function is valid under the requirement of the annotated (valid) type or whether the function is, however, applied to an operand in the program which does not have the expected annotated type despite the valid functional definition. This separate check allows a modular check and a meaningful error diagnosis with a small effort.

The above-described rule for checking type annotations can be realized in the case of functional definitions by a corresponding type association rule which is to be applied to functional definitions, optionally in combination with a well-formedness rule which reflects the requirement under which a type having a functional type as a fundamental type is assumed as well-formed. In the following, a corresponding type association rule T-LAM is given by way of example which comprises the requirement that with an expression λx:T.e, the type T is well-formed (expressed by T:*), and a well-formedness rule WF-FUN in which the requirement is formulated that a functional type is only well-formed with a static binding time.

$$\frac{T: \star\ \Gamma, x: T \vdash e: T'}{\Gamma \vdash \lambda x: T \cdot e: S(T \to T')}(T\text{-}L_{AM})$$

$$\frac{M_1 C_1: \star\ \ M_2 C_2: \star}{S(M_1 C_1 \to M_2 C_2): \star}(WF\text{-}F_{UN})$$

In principle, rules in accordance with the above convention are to be understood such that the one or more requirements formulated above the horizontal dividing line are checked on the application of the respective rule and the one or more conclusions shown beneath the dividing line are derived when the requirements are satisfied. A total overview of preferred typification rules is contained in the following tables 3a, 3b, 3c and 3d explained in connection with preferred embodiments.

As described above, the explicit type annotation in the definition of function variables facilitates the type check and allows a modular check and a meaningful error diagnosis. The method can therefore require that an explicit annotation of the type described above is provided in functional definitions for each functional variable, wherein otherwise e.g. an error message can be output. The annotation of a complete type having both a fundamental type and a binding time of the respective functional variable is requested. To simplify the notation, it can also be valid for a functional definition to comprise an explicit type annotation which, however, only reflects the fundamental type and not the binding time of the type of the variable and/or for the annotation to reflect an assembled fundamental type for the functional variable and in this respect only to reflect the fundamental type of the types in each case from which the assembled fundamental type is assembled, i.e. e.g. x:(int→int) instead of x:S(D int→D int). The method can then treat the definition as if a valid annotation had been annotated which has the respective fundamental type and a binding time valid for this fundamental type. In this respect, the static binding time can e.g. be assumed for functions and/or—where admissible—the dynamic binding time for all other types. Alternatively, an error message can be output and/or a demand can be output to annotate the binding time. In accordance with an embodiment, an explicit annotation of the binding time is requested at least for functional types.

In accordance with an embodiment, a linear order is defined on the binding times M in accordance with which the static binding time S is smaller than the dynamic binding time D. In accordance with the definition of such an order, it can be valid during the type check that an expression having a static binding time S can also be used at a point in the program at which an expression having a dynamic binding time D is expected provided that a corresponding well-formed type having a dynamic binding time is present. This means that in particular expressions having a static base type can also be used when a dynamic base type is expected, whereas, on the other hand, functional expressions only having a static binding time can be used since no well-formed functional type having a dynamic binding time exists.

Such an order or sequence can be formalized by a rule such as the following B-STATIC rule whose applicability is checked when a specific order of the binding times of sub-expressions of an expression to be typified is specified as a requirement in a type association rule. The order of the binding times is preferably reflexive as is formalized in the following by the exemplary rule B-REFL:

S<:D (B-S$_{TATIC}$)
M<:M (B-R$_{EFL}$)

A base type B having each binding time S, D is preferably assumed as well-formed during the type check. Variables can therefore be used in the program which represent dynamic values of the respective base types, e.g. whole-number numerical values or dynamic floating point numerical values, as can variables which represent statically known values of the respective base type. The assumption of base types having any binding time as well-formed is preferably specified in a well-formedness rule for base types. A corresponding exemplary rule WF-BASE is given in the following:

M B:*(WF-B$_{ASE}$)

In accordance with an advantageous embodiment, during the type check, a type $M(T_1 \to T_2)$ having a functional type $T_1 \to T_2$ as a fundamental type is only assumed as well-formed if the functional type reflects a well-formed target type $T_2$ and respectively reflects a well-formed definition type $T_1$ for the one or more variables of the function when the type $M(T_1 \to T_2)$ has a static binding time S. It is thereby ensured that a functional type is only used together with the static binding time during the type check. The above-described condition can be realized by a well-formedness rule which is used to determine whether a functional type is well-formed. This well-formedness rule can in particular correspond to the above-given rule WF-FUN.

The above rule WF-FUN is applicable to unary or single-digit functions, i.e. functions whose definition set comprises exactly one variable. In principle, a corresponding rule can also be set up for multi-digit functions, i.e. functions having a plurality of variables, the rule checking whether every definition type is a well-formed type and whether the target type is well-formed to assume a function type as being well-formed. Since a multi-digit function, however, can also always be represented as a nesting of a corresponding number of unary functions, unary functions are assumed for reasons of simplicity in the rules specifically formalized as an example here.

The well-formedness rules are preferably always applied when a type is annotated in a functional definition whose well-formedness is to be checked and preferably when a super-type is to be associated with an expression within the framework of a sub-typification so that the expression can satisfy the requirements of a type association rule to be applied, as will be explained further below.

In accordance with an embodiment, the set of the fundamental types C comprises a set of assembled fundamental types for describing assembled values which comprises a pair type $T_1 \times T_2$ for describing pairs of values. Such assembled fundamental types for describing assembled values and in particular pair types allow the combination of a plurality of values in pairs, wherein the assembly of any desired number of values is possible by nesting a plurality of pairs in one another, whereby the flexibility of the programming is substantially increased. A fundamental type for describing an assembled value preferably reflects a respective fundamental type for each of the elements or for each of the values from which the assembled value is assembled.

A type $M(M_1 C_1 \times M_2 C_2)$ having a pair type $M_1 C_1 \times M_2 C_2$ as the fundamental shape is preferably only assumed as well-formed during the type check when the types $M_1 C_1$, $M_2 C_2$, which describe the elements of the pair, are each well-formed and have binding times $M_1$, $M_2$ which are not smaller than the binding time M of the type $M(M_1C_1 \times M_2C_2)$.

The well-formedness of a pair type in accordance with the above description is preferably checked by applying a well-formedness rule for pairs which can, for example, correspond to the rule WF-PAIR given below:

$$\frac{M_1C_1: \star \quad M_2C_2: \star \quad M <: M_i}{M(M_1C_1 \times M_2C_2): \star}(WF\text{-}P_{AIR})$$

The relationship $M<:M_i$ with i=1, 2 in this respect expresses that the binding times $M_1$, $M_2$ are not smaller than the binding time M of the pair type.

In accordance with a further embodiment, a functional type T□T' having a static binding time S and reflecting the types T given for the one or more functional variables x as definition types of the function and the types T' associated with the body as a target type of the function is associated with an expression □x:T.e which defines a function having at least one functional variable x and comprises an indication of the type T of each functional variable x as well as an indication of the body e of the function exactly when the indicated type T of each functional variable x is well-formed and a type T' is associated with the body e of the function in the context □ of the expression □x:T.e and comprises the one or more functional variables x having the respective indicated types T of each functional variable x.

The indication of the type T of each functional variable x is in this respect preferably an explicit type annotation carried out as described above e.g. by the programmer. Functional definitions are typified and thus initially permitted by the association of the static binding time with the functional type under the above requirement so that the programming of first-class static functions is made possible. It is ensured in cooperation with the remaining typification rules that functions are only used such that they can be statically evaluated and otherwise a typification error occurs and a corresponding error message can be output. For example, it is ensured in connection with the typification rule still to be described for conditional expressions that the use of a functional definition as a branch or case in a conditional if-else expression which has a condition having a dynamic binding time results in a type error. It is thus recognized that the conditional expression could not be eliminated by partial evaluation in this case and the program could consequently not be partially evaluated to a first order program.

The above-described rule is preferably realized by a type association rule which is applied when a functional definition is to be typified. An exemplary rule T-LAM for unary functional definitions is given below.

$$\frac{T: \star \quad \Gamma, x: T \vdash e: T'}{\Gamma \vdash \lambda x: T \cdot e: S(T \to T')}(T\text{-}L_{AM})$$

The type relation $\Gamma \vdash e:T$ means that the type T comprising a fundamental type and a binding time is associated with the expression e in the context $\Gamma$ of the expression. The typification context $\Gamma$ of an expression e preferably contains at least those variables having the respective associated types which are defined in the expressions at a higher rank than the respective expression, wherein the symbol $\Gamma$ always designates the context of the respective expression to be typified by the type association rule in the type association rules indicated by way of example. The above rule T-LAM accordingly states that the indicated type is associated with the expression $\lambda x$:T.e in the context $\Gamma$ of the expression $\lambda x$:T.e under the indicated further requirements when the type T' is associated with the expression e in the context $\Gamma$, x:T, i.e. in the context which contains the context $\Gamma$ of the expression $\lambda x$:T.e itself as well as the additional type association pair x:T having the variable x and the type T.

When in the present description reference is generally made to the fact that a type is associated with an expression or that a check is made whether a type is associated with an expression, this is preferably to be understood, unless otherwise stated, that the type is associated with the expression in the context of the expression.

In accordance with a further embodiment, during the type check a pair type $(T_1 \times T_2)$ having a static binding time S and describing the first element of the pair by the first type $T_1$ and describing the second element of the pair by the second element $T_2$ is associated with an expression $(e_1,e_2)$ which defines a pair, with a first element of the pair being indicated by a first sub-expression $e_1$ and a second element of the pair being indicated by a second sub-expression $e_2$ exactly when a first type $T_1$ is associated with the first sub-expression $e_1$ and a second type $T_2$ is associated with the second sub-expression $e_2$.

The above rule is preferably implemented by a type association rule which is checked when an expression defining a pair is to be typified. Such a rule T-PAIR is given by way of example in the following:

$$\frac{\Gamma \vdash e_1:T_1 \quad \Gamma \vdash e_2:T_2}{\Gamma \vdash (e_1, e_2):S(T_1 \times T_2)}(T\text{-Pair})$$

A respective reflexive and transitive sub-type relationship is preferably defined both to the set of the types T and to the set of the fundamental types C. A sub-type relationship determines the conditions under which a type is a sub-type of another type, with the last-named type than also being designated as the sub-type. If a type is a sub-type of another type, an expression with which the subtype is associated is preferably also allowed within the framework of the type check wherever an expression is valid or expected by the sub-types provided that both types are well-formed. The definition of the sub-type relationships simplifies the type check since different types can be treated using the same typification rules. To check whether a type is a sub-type of another type, one or more sub-type rules can be checked and applied which define when a type is a sub-type of another type.

A first type T=MC comprising a binding time M and a fundamental type C is preferably assumed as a sub-type of a second type T'=M'C' exactly when the binding time M of the first type T is smaller than or equal to the binding time M' of the second type and when the base type C of the first type T is a sub-type of the fundamental type C' of the second type T'. Due to the linear order of the binding times with S<:D in accordance with the rule B-STATIC, this means that a type comprising a fundamental type and a static binding time is always a sub-type of the same fundamental type and types having a dynamic binding time. It is achieved by the above sub-type designation that a static expression in the program can also always be used where an expression is expected within the framework of the type check having a corresponding fundamental type and a dynamic binding time, provided that both types are well-formed.

The above rule is preferably implemented by a sub-type rule which is applied to check whether a type is a sub-type of another type. Such a rule SUB-TYPE is given by way of example in the following:

$$\frac{M<:M' \quad C<:C'}{MC<:M'C'}\text{(SUB-TYPE)}$$

The notation T<:T' means that the type T is a sub-type of the super-type T'. Whereas the above rule defines sub-type relationships between types comprising a binding time and a fundamental type, sub-type relationships between fundamental types are explained in the following.

A first functional type $T_{11} \rightarrow T_{12}$ is assumed as a subtype of a second functional type $T_{21} \rightarrow T_{22}$ exactly when each definition type $T_{21}$ of the second functional type is a sub-type of the respective corresponding definition type $T_{11}$ of the first functional type and the target type $T_{12}$ of the first functional type is a sub-type of the target type $T_{22}$ of the second functional type. The requirement that the definition type $T_{21}$ of the second functional type is a sub-type of the definition type $T_{11}$ of the first functional type means that the first functional type has to describe a function which at least accepts and can process those arguments or operands which the second functional type accepts and processes. The requirement that the target type $T_{12}$ of the first functional type is a sub-type of the target type $T_{22}$ of the second functional type means that the first functional type has to describe a function which delivers an expression having a type $T_{12}$ which may validly be used everywhere where an expression of the type $T_{22}$ is expected.

The above rule is preferably implemented by a sub-type rule for functional types which is applied to check whether a functional type is a sub-type of another functional type. Such a rule SUB-FUN is given by way of example in the following.

$$\frac{T_{21}<:T_{11} \quad T_{12}<:T_{22}}{T_{11} \rightarrow T_{12} <: T_{21} \rightarrow T_{22}}\text{(SUB-FUN)}$$

In accordance with a further embodiment, a first pair type $T_{11} \times T_{12}$ is assumed as a sub-type of a second pair type $T_{21} \times T_{22}$ exactly when the type $T_{11}$ of the first element of the first pair type is a sub-type of the type $T_{21}$ of the first element of the second pair type and the type $T_{12}$ of the second element of the first pair type is a sub-type of the type $T_{22}$ of the second element of the second pair type. It is thereby made possible to use a pair type where a pair type is expected whose elements are super-types of the types of the elements of the existing pair types. The above rule is preferably implemented by a sub-type rule which is applied to check whether a pair type is a sub-type of another pair type. Such a rule SUB-PAIR is given by way of example in the following.

$$\frac{T_{11}<:T_{21} \quad T_{12}<:T_{22}}{T_{11} \times T_{12} <: T_{21} \times T_{22}}\text{(SUB-PAIR)}$$

In accordance with an advantageous embodiment, during the type check, any desired second type T' is associated with an expression e, with which a first type T is associated, exactly when the second type T' is well-formed and when the first type T is a sub-type of the second type T'. The definition of the sub-type relationships therefore makes it possible to associate another type which is a super-type of the second type to an expression with which a type is associated. The requirement that the super-type T' to be associated has to be a well-formed type ensures in this respect that a syntactically existing super-type is not associated when it is not well-formed so that, for example, no functional type having a dynamic binding time can be associated.

The above rule is preferably implemented by a sub-type association rule which is preferably checked when a type has been associated with an expression which does not satisfy a requirement of a rule to be checked for the typification of a higher-ranking expression to associate a super-type with the expression where possible which satisfies the requirement. If this is not possible, a type error is preferably output and an error message is generated. Otherwise, the matching type is associated, the type association rule to be applied to the higher-ranking expression is applied and the type check is thereby continued. A sub-type association rule T-SUB as described above is given by way of example in the following:

$$\frac{\Gamma \vdash e:T \quad T':\star \quad T<:T'}{\Gamma \vdash e:T'}\text{(T-SUB)}$$

The definition of the sub-types thus has the result that during the type check, an expression can also always satisfy a demand made on its type by a type association rule when the type associated with it is a sub-type of the type demanded by the type association and the demanded type is well-formed. When it is described as a requirement for the successful application of a type association rule in the present description that a specific type is associated with one or more expressions, this is to be understood such that the respective rule can instead also require that a type has to be associated with the respective expressions which is identical to the respective specific type or is a well-formed sub-type of the specific type.

As described above, the type system is preferably defined by a set of rules which are applied to associate a type with each expression of the program. In this respect, a type association rule by using which the expression is checked, i.e. whose requirements are checked and by using which a type is associated with the expression when the requirements of the rule are satisfied, is preferably associated with every type of expression, i.e. in particular functional definitions, pair definitions, functional applications, conditional expressions, etc. The above-described sub-type association rule represents an additional rule which is preferably applied to a sub-expression of a higher ranking expression just checked by using a type association rule to be checked when the sub-expression does not satisfy a requirement with respect to the type of the sub-expression specified for the higher-ranking expression.

In accordance with an advantageous embodiment, during the type check, the second type MC, i.e. the common type of the second and third sub-expressions e, e', is associated with a conditional expression whose condition is given by a first sub-expression $e_p$ and whose at least two cases are given by a second and a third sub-expression e, e' when a first type M bool having a Boolean fundamental type bool and having any desired first binding time M is associated with the first sub-expression $e_p$ and when a respective identical second type MC is associated with any desired identical fundamental type C and with the first binding time M.

The typification of a conditional expression or of a conditional therefore requires that the sub-expressions forming the cases or the branches of the conditional have the same binding time as the sub-expression defining the condition and the sub-expressions forming the cases simultaneously have the same type. In view of optionally defined sub-type relationships, these requirements are equivalent to that fact that the sub-expressions forming the two cases have a common super-type which has the same binding time as the expression forming the condition.

The above rule is preferably implemented by a type association rule which is checked when a conditional expression is to be typified. Such a rule T-COND is given by way of example in the following.

$$\frac{\Gamma \vdash e_p:M \text{ bool } \Gamma \vdash e:MC \; \Gamma \vdash e':MC}{\Gamma \vdash \text{if } e_p \text{ then } e \text{ else } e':MC}(T\text{-}COND)$$

For example, a conditional expression whose condition is given by a first sub-expression and whose at least two cases are given by a second and a third sub-expression is not accepted when a dynamic binding time is associated with the conditional expression and when a functional type as a fundamental type or an assembled fundamental type which contains a functional type is associated with at least one of the two cases.

A further embodiment provides that during the type check, the target type T of the functional type $T_2 \rightarrow T$ is associated as a type with an expression $e_1 e_2$ which defines an application whose operator is formed by a first sub-expression $e_1$ and whose one or more operands, which are also called arguments, are each formed by a further sub-expression $e_2$ exactly when a functional type $T_2 \rightarrow T$ is associated with the operator and when a respective type $T_2$ is associated with the one or more operands, said type $T_2$ being identical to the corresponding definition type of the functional type $T_2 \rightarrow T$ or being a sub-type thereof. Since a check is made whether a type is associated with the operand which corresponds to the corresponding definition type of the functional type, it is ensured that a type error occurs when a function is applied to an operand which does not correspond to the corresponding definition type, wherein the definition type, as described above, can preferably be determined by an explicit type annotation.

For example, an expression which defines an application of a function cannot be accepted when a definition type of the function to be applied has a static binding time and a dynamic binding time is associated with the corresponding operand to which the function is applied.

The above specification is preferably implemented by a type association rule which is checked when an expression defining a functional application is to be typified. Such a rule T-APP is given by way of example in the following:

$$\frac{\Gamma \vdash e_1:S(T_2 \rightarrow T) \; \Gamma \vdash e_2:T_2}{\Gamma \vdash e_1 e_2:T}(T\text{-}APP)$$

The program preferably has a specifically characterized definition of a starter function in which the evaluation of the program starts on the ultimately direct execution on a computer system. The starter function preferably has one or more functional variables which can adopt values handed over to the program by another program on its call so that the program can generate run time-dependent results. The definition of the starter function, as generally described above with respect to functions, is preferably also checked as to whether it has a valid type. A check is preferably made as an additional demand on the starter function and the starter function is only accepted when it does not define any functional variables which have a static binding time, i.e. it can in particular be demanded that a type having a dynamic binding time is annotated for the one or more variables of the starter function. This is necessary to allow a correct binding time analysis since the transfer values to the starter function, i.e. the program as a whole, are generally unknown before the run time by a program to be called. Accordingly, the starter function may preferably not define any functional variables which have a functional type since a functional type is only permitted with a static binding time, but the static binding time is preferably not permitted for the functional variables of the starter function for the above reasons. A check is furthermore preferably made and the starter function is only accepted when a type is associated with its body which is not a functional type or which does not e.g. contain any functional type in the case of an assembled type.

A further subject of the invention is a method for the transformation of a computer program which is present in a programming language which supports first-class functions, in which a type check of the program or at least of a part of the program is carried out to associate a type with each expression of the program or of the part of the program, said type comprising a fundamental type and a binding time, wherein the quantity of the fundamental types comprises at least base types for the description of simple values and a functional type for the description of functions and the set of the binding times comprises at least one static binding time and one dynamic binding time and wherein, during the type check, a functional type is only accepted together with the static binding time. When the program or the part of the program is accepted by the type check, all the first-class functions contained in the program or in the part of the program are eliminated by a partial evaluation of the program or of the part of the program. When the program e.g. contains an expression which represents an application of a first-class function, the expression is converted by a partial evaluation into an expression which does not contain any application of a first-class function.

The method for the transformation of a computer program comprises a type check of the program as described above. The advantageous embodiments and advantages described above with respect to the method for checking and/or transforming of a computer program apply accordingly to the method for transforming the computer program.

The method comprises the fact that the program is partially evaluated when the type check is successful to transform the program into an equivalent program without first-class functions. The partially evaluated program thus satisfies the functionality of the original program and can simultaneously be carried out with a shorter run time since the additional processes associated with the use of first-class functions such as the dereferencing of function pointers and the dynamic memory allocation are not necessary. The program can accordingly even be carried out on hardware which does not support the above functions.

Programs can thus be developed using first-class functions, whereby the efficiency of the development is increased, for example, by reusing functions and by a modular program design without losses in performance due to first-class functions occurring in the ultimate execution of the resulting program on the hardware. It can be reliably determined with a small time effort by the described checking method whether a given program can be transformed in the described manner, with otherwise a precise statement on the cause of the error being made in the program and being displayed to the user so that the error can be easily remedied and the programming of valid, i.e. transformable, programs is possible with a small effort.

The partial evaluation can comprise the application of the semantics of the programming language to the expressions contained in the program, with sub-expressions being evaluated whose value is statically known. The partial evaluation can e.g. comprise the inline expansion of the body of a function from a functional definition in an application expression calling the function. Suitable methods for a partial evaluation are known per se and are described, for example, in "Partial evaluation and automatic program generation" by Neil Jones, Prentice Hall International 1993.

First, i.e. in particular before a final compiling and/or assembling, the original program can be translated into a partially evaluated program which is present in a programming language which can correspond to the programming language of the original program and/or which can be a programming language which can be higher and/or which is located at the high-language level. The partial evaluation can be carried out by interpretation of the original computer program.

The partially evaluated program or the program with the partially evaluated expression is preferably translated into a machine code, preferably at an order set level, which can be directly executed by a target computer system. For this purpose, the partially evaluated program can be complied by a compiler and can subsequently optionally be assembled by an assembler. The assembled program can subsequently be directly executed by a target computer system. The target computer system can be a different computer system than that on which the check and/or the partial evaluation and/or compilation and/or assembly is/are carried out; but the same computer system can in principle also be used. In accordance with an embodiment, the program with the partially evaluated expression or the partially evaluated program is translated into a machine code for a hardware platform which does not offer any support for function pointers and/or which does not offer any support for a dynamic memory allocation.

As a result, a complete evaluation of the original computer program thus takes place in accordance with the evaluation semantics underlying the programming language of the original program, wherein first a static partial evaluation takes place, i.e. a partial evaluation taking place at the translation time, and subsequently the remaining dynamic evaluation, i.e. the evaluation of the partially evaluated program taking place at the run time or execution time, wherein the remaining evaluation preferably takes place by a direct execution of a machine code generated from the partially evaluated program.

The method or methods in accordance with the invention can each in principle be carried out on one or more computer systems formed e.g. as personal computers. The program is preferably a shader program for 3D visualization which can be carried out directly, optionally after the transformation, by a processor, in particular a graphics process, to generate a three-dimensional graphics and preferably to display on a display unit, while the check, transformation, compiling and/or assembling can be carried out on an all-round processor. The generation of the graphics can in particular take place in real time.

The invention will be explained in the following with reference to a plurality of examples.

The syntax of the programming language, which is preferably based on the $\lambda$ calculus, has been initially explained and is shown in Table 1. Based on the syntax, evaluation semantics are defined in accordance with the semantic rules of the programming language shown below in Table 2.

TABLE 2

(Semantics)

$$\boxed{e \Rightarrow e}$$

$$\frac{e_1 \Rightarrow e'_1}{e_1 e_2 \Rightarrow e'_1 e_2}\text{(E-APP1)} \qquad \frac{e_2 \Rightarrow e'_2}{v_1 e_2 \Rightarrow v_1 e'_2}\text{(E-APP2)}$$

$$\lambda x{:}T.e\ v \Rightarrow e[x \rightarrow v]\ \text{(E-ABSAPP)} \qquad \frac{\delta\ (v_1, v_2) = v}{v_1 v_2 \Rightarrow v}\text{(E-PRFAPP)}$$

$$\frac{e_1 \Rightarrow e'_1}{(e_1, e_2) \Rightarrow (e'_1, e_2)}\text{(E-TUP1)} \qquad \frac{e_2 \Rightarrow e'_2}{(v_1, e_2) \Rightarrow (v_1, e'_2)}\text{(E-TUP2)}$$

$$\frac{e \Rightarrow e'}{\text{fst } e \Rightarrow \text{fst } e'}\text{(E-FSTARG)} \qquad \text{fst } (v_1, v_2) \Rightarrow v_1\ \text{(E-FST)}$$

$$\frac{e \Rightarrow e'}{\text{snd } e \Rightarrow \text{snd } e'}\text{(E-SNDARG)} \qquad \text{snd } (v_1, v_2) \Rightarrow v_2\ \text{(E-SND)}$$

$$\frac{e_1 \Rightarrow e'_1}{\text{if } e_1 \text{ then } e_2 \text{ else } e_3 \Rightarrow \text{if } e'_1 \text{ then } e_2 \text{ else } e_3}\text{(E-CONDPRED)}$$

if true then $e_2$ else $e_3 \Rightarrow e_2$ (E-CONDTRUE)
if false then $e_2$ else $e_3 \Rightarrow e_3$ (E-CONDFALSE)

The notation e⇒e means that the left hand expression e is evaluated with respect to the right hand expression e. The semantics given correspond to call-by-value semantics. The substitution formula e [x↦ v] is used in the evaluation rule E-ABSAPP for applications $e_1 e_2$ of functions in Table 2. This means that every free occurrence of the variable x in the expression e is replaced with the value v.

The typification rules underlying the type check are given in the Tables 3a, b, c below. The rules in Table 3a determine the linear order of the binding times; the rules in Table 3b determine the well-formedness of types; the rules in Table 3c determine sub-type relationships between different types and between different fundamental types; and the rules in Table 3a determine the type association with the program expressions.

TABLE 3a (Linear order binding times)

M <: M (B-REFL)
S <: D (B-STATIC)

M <: M

TABLE 3b (Well-formedness rules):

$$\boxed{T: *}$$

$$M\ B: * \quad \text{(WF-BASE)}$$

$$\frac{M_1 C_1 : *\ M_2 C_2 : *}{S\ (M_1 C_1 \to M_2 C_2): *} \text{(WF-FUN)}$$

$$\frac{M_1 C_1 : *\ M_2 C_2 : *\ M <: M_i}{M\ (M_1 C_1 \times M_2 C_2): *} \text{(WF-PAIR)}$$

TABLE 3c (Sub-typification rules):

$$\boxed{T <: T}\ \boxed{C <: C}$$

$$\frac{M <: M'\ C <: C'}{M\ C <: M'\ C'} \text{(SUB-TYPE)}$$

$$B <: B \quad \text{(SUB-BASE)}$$

$$\frac{T_{21} <: T_{11}\ T_{12} <: T_{22}}{T_{11} \to T_{12} <: T_{21} \to T_{22}} \text{(SUB-FUN)}$$

$$\frac{T_{11} <: T_{21}\ T_{12} <: T_{22}}{T_{11} \times T_{12} <: T_{21} \times T_{22}} \text{(SUB-PAIR)}$$

TABLE 3d (Type association rules):

$$\boxed{\Gamma \vdash e: T}$$

$$\frac{\Gamma \vdash e: T\ T': *\ T <: T'}{\Gamma \vdash e: T'} \text{(T-SUB)}$$

$$\frac{x: T \in \Gamma}{\Gamma \vdash x: T} \text{(T-VAR)}$$

$$\frac{T \in \text{type}(c)}{\Gamma \vdash c: T} \text{(T-CONST)}$$

$$\frac{T: *\ \Gamma, x: T \vdash e: T'}{\Gamma \vdash \lambda x: T.e: S\ (T \to T')} \text{(T-LAM)}$$

$$\frac{\Gamma \vdash e_1 : S\ (T_2 \to T)\ \Gamma \vdash e_2 : T_2}{\Gamma \vdash e_1\ e_2 : T} \text{(T-APP)}$$

$$\frac{\Gamma \vdash e_1 : T_1\ \Gamma \vdash e_2 : T_2}{\Gamma \vdash (e_1, e_2): S\ (T_1 \times T_2)} \text{(T-PAIR)}$$

$$\frac{\Gamma \vdash e: M\ (T_1 \times T_2)}{\Gamma \vdash \text{fst}\ e: T_1} \text{(T-PRJ1)}$$

$$\frac{\Gamma \vdash e: M\ (T_1 \times T_2)}{\Gamma \vdash \text{snd}\ e: T_2} \text{(T-PRJ2)}$$

$$\frac{\Gamma \vdash e_p : M\ \text{bool}\ \Gamma \vdash e: M\ C\ \Gamma \vdash e': M\ C}{\Gamma \vdash \text{if}\ c_p\ \text{then}\ c\ \text{else}\ c': M\ C} \text{(T-COND)}$$

The rules for the order of the binding times in accordance with Table 3a and the rules for checking the well-formedness of types in accordance with Table 3b and the rules for checking the presence of a sub-type relationship, with the exception of the rule SUB-BASE, are explained in the following general description. The SUB-BASE rule describes that a base type always only has itself as a super-type or sub-type so that base types in the present embodiment cannot be swapped with one another.

The type association rules in accordance with Table 3d are explained in the above general description, with the exception of the rules T-VAR, T-CONST, T-PRJ1 und T-PRJ2.

The rule T-VAR orders the occurrence of a variable x in an expression to the types T when the respective contact $\Gamma$ contains a corresponding type association or type annotation x:T. The rule T-VAR therefore serves to look up in the context $\Gamma$ whether the type is annotated for the variable x in the context $\Gamma$ and to associate this type T with the variable x in this case. The rule T-VAR is applied when a variable occurs in a higher-ranking expression and its type is significant for the application of a typification rule to be used for the typification of the higher-ranking expression.

The rules T-PRJ1 and T-PRJ2 are to be applied for the typification of expressions which represent a projection of a pair, i.e. to expressions of the kind fst e, snd e, where the expression fst e means the projection onto the first element $e_1$ of a pair $(e_1, e_2)$ and the expression snd e means the projection onto the second element $e_2$ of a pair $(e_1, e_2)$ (see the application rules E-FSTARG, E-FST, E-SNDARG, E-SND in Table 2). The type association rules T-PRJ1 and T-PRJ2 determine that the type which is associated with the respective element, i.e. the first or second element, of the pair is associated with such an expression.

The rule T-CONST is applied to constant symbols c and orders a type T to a constant symbol c, the type T being given in the association table (c) (see the following Table 4) as a possible type of this symbol.

TABLE 4

(Type association table type (c) for constant symbols):
$$c \in B.\text{type}(c) = \{S\ \text{bool}\}$$
$$c \in Z.\text{type}(c) = \{S\ \text{int}\}$$
$$\text{type}(\text{not}) = \{S\ (S\ \text{bool} \to S\ \text{bool}).S\ (D\ \text{bool} \to D\ \text{bool})\}$$

$$c \in \{\text{and}, \text{or}\} \cdot \text{type}(c) = \left\{ \begin{array}{l} S(S\ \text{bool} \times S\ \text{bool}) \to S\ \text{bool}), \\ S(D\ \text{bool} \times D\ \text{bool}) \to D\ \text{bool}) \end{array} \right\}$$

$$c \in \{=, <\} \cdot \text{type}(c) = \left\{ \begin{array}{l} S(S\ \text{int} \times S\ \text{int}) \to S\ \text{bool}), \\ S(D\ \text{int} \times D\ \text{int}) \to D\ \text{bool}) \end{array} \right\}$$

$$c \in \{+, -\} \cdot \text{type}(c) = \left\{ \begin{array}{l} S(S\ \text{int} \times S\ \text{int}) \to S\ \text{int}), \\ S(D\ \text{int} \times D\ \text{int}) \to D\ \text{int}) \end{array} \right\}$$

In Table 4, the types for Boolean constants from the set B (true and false), for whole-number numerical values from the set Z, i.e. constants of the type int ( . . . , −1, 0, 1, . . . ), and for the operators not, and, or, =, <, +, − are given which represent constant primitive functions which are defined in the normal manner.

Since constant symbols are not further evaluated and their values are statically known, the static binding time S is associated with the constant symbols. Two respective different functional types are provided for the functional value operators in type (c), namely in each case, on the one hand, a functional type which describes a function which maps from a static type onto a static type and, on the other hand, a functional type which describes a function which maps from a dynamic type onto a dynamic type. The fact is thereby taken into account that the primitive functions can be applied both to static arguments, in which case they deliver static values, and to dynamic values, in which case they deliver dynamic values. During the type check, that type is associated with the respective operator constant which is expected from the typification rule to be used on the respective higher-ranking expression which contains the operator to check whether the typification can be used successfully.

In the following Table 5, the evaluation rules are given in accordance with which the partial evaluation takes place.

TABLE 5

(Rules partial evaluation):

$$PE \llbracket c \rrbracket = c$$
$$PE \llbracket x \rrbracket = x$$
$$PE \llbracket \lambda x:T.e \rrbracket = \lambda x:T.PE \llbracket e \rrbracket$$

$$PE \llbracket e_1 \ e_2 \rrbracket = \begin{cases} PE \llbracket e[x \mapsto e_2] \rrbracket & \text{if } PE \llbracket e_1 \rrbracket = \lambda x:T.e \\ c & \text{if } \delta \ (PE \llbracket e_1 \rrbracket, PE \llbracket e_1 \rrbracket) = c \\ PE \llbracket e_1 \rrbracket \ PE \llbracket e_2 \rrbracket & \text{else} \end{cases}$$

$$PE \llbracket (e_1, e_1) \rrbracket = (PE \llbracket e_1 \rrbracket, PE \llbracket e_2 \rrbracket)$$

$$PE \llbracket \text{fst } e \rrbracket = \begin{cases} e_1 & \text{if } PE \llbracket e \rrbracket = (e_1, e_2) \\ \text{fst } PE \llbracket e \rrbracket & \text{else} \end{cases}$$

$$PE \llbracket \text{snd } e \rrbracket = \begin{cases} e_2 & \text{if } PE \llbracket e \rrbracket = (e_1, e_2) \\ \text{snd } PE \llbracket e \rrbracket & \text{else} \end{cases}$$

$$PE \llbracket \text{if } e_p \text{ then } e_t \text{ else } e_e \rrbracket =$$
$$\begin{cases} PE \llbracket e_t \rrbracket & \text{if } PE \llbracket e_p \rrbracket = \text{true} \\ PE \llbracket e_e \rrbracket & \text{if } PE \llbracket e_p \rrbracket = \text{false} \\ \text{if } PE \llbracket e_p \rrbracket \text{ then } PE \llbracket e_t \rrbracket \text{ else } PE \llbracket e_e \rrbracket & \text{else} \end{cases}$$

The symbol $P\varepsilon \llbracket e \rrbracket$ means that the expression e is partially evaluated and the right hand side of the equations respectively indicates the result of the partial evaluation. The curly brackets on the right hand side of the equations respectively serve for the case distinction. The semantics underlying the partial evaluation correspond Table 2 to the semantics of the programming language shown in Table 2. The application of a functional symbol or of an operator to one or more constant arguments is replaced by the formula $\delta(e_1, e_2)$ with a constant value, i.e. e.g. $\delta(\text{not}, \text{true}) = \text{false}$ and $\delta(+, (41,1)) = 42$.

In the following, the typification of programs is explained with reference to a plurality of examples using the above rules and tables.

EXAMPLE 1

The first example relates to the functions ad, sub and apply defined in the initially given program code 1. The following rule application diagram 1 shows which typification rules are used on which expressions to typify these functions.

The program shown in the program code 1 in a C-type syntax is shown in the $\lambda$ syntax defined in Table 1 for the type check. In this representation, the definitions of the functions add, sub and apply result at:

Program code 4:

add=$\lambda$a:D int.$\lambda$b:D int.+(a,b)

sub=$\lambda$a:D int.$\lambda$b:D int.−(a,b)

apply=$\lambda$f:S(D int→S(D int→D int)).$\lambda$a:D int.$\lambda$b:D int.(f a)b The apply function shown in the original program code 1 as a function with three functional variables f, a, b is shown in the $\lambda$ calculus by three nested functions each having a functional variable f or a or b since unary functions are assumed in the present representation. The functions add and sub are equally each shown as two nested functions each having a functional variable a or b. The dynamic binding time is assumed for the variables a and b for which a fundamental type (int) is admittedly annotated, but not a binding time, since the dynamic binding time is generally valid for the fundamental type int. The binding time S is assumed for the variable f of the apply function for which a functional type, but not a binding time, is explicitly annotated as the fundamental type since only the static binding time is valid for functional types. In principle, the user could also be prompted within the framework of the method to carry out an explicit binding time annotation for the variables a, b and/or f. The target type of the functions add, sub and apply likewise annotated in the C syntax in program code 1 is insignificant in the present embodiment and is ignored.

Rule Application Diagram 1 (Part 1/4)

add add=$\lambda$a:D int.$\lambda$b:D int.+(a,b)

$$(T\text{-}CONST)\frac{S(D(Dint \times Dint) \to Dint) \in \text{type}(+)}{a:Dint, b:Dint \vdash +:S(D(Dint \times Dint) \to Dint)}\cdots$$

sub sub=$\lambda$a:D int.$\lambda$b:D int.−(a,b) Similar.

apply

The calculus only supports unary functional definition, apply becomes apply=$\lambda$f:S(D int→S(D int→D int)).$\lambda$a:D int.$\lambda$b:D int.(f a)b $$(WF\text{-}BASE)\frac{\overline{Dint:\star}(WF\text{-}BASE)\frac{\overline{Dint:\star}(WF\text{-}BASE)\overline{Dint:\star}}{S(Dint \to Dint):\star}}{S(Dint \to S(Dint \to Dint)):\star}:::$$

$$\cdot \vdash \lambda:S(Dint \to S(Dint \to Dint)).$$

where $\Gamma$=f:S(D int→S(D int→D int)),a:D int,b:D int

Rule Application Diagram 1 (Part 2/4): See FIG. 1.

Rule Application Diagram 1 (Part 3/4): See FIG. 2.

Rule Application Diagram 1 (Part 4/4)

$$(B\text{-STATIC}) \quad \cfrac{S <: D \quad \cfrac{(B\text{-REFL}) \cfrac{}{D <: D} \quad \cfrac{}{\text{int} <: \text{int}} \text{ (SUB-BASE)}}{\cfrac{D\text{int} <: D\text{int}}{D\text{int} \times D\text{int} <: D\text{int} \times D\text{int}} \text{ (SUB-PAIR)}} \text{ (SUB-TYPE)}}{S(D\text{int} \times D\text{int}) <: D(D\text{int} \times D\text{int})} \text{ (SUB-TYPE)}$$

As can be seen from diagram 1, the functions add and sub can be successfully typified. The typification of the sub function is not shown in the diagram since it corresponds to the typification of the add function which is equivalent to this extent. The type S(D int→S(D int→D int)) is associated with the add and sub functions, i.e. it is determined that the add and sub functions are each to be used statically and it is recognized that the add and sub functions each map a dynamic value of the fundamental type int (definition type) onto a static function (target type) which maps a dynamic value of the fundamental type into onto a dynamic value of the fundamental type int. The functional type as a target type in this respect results on the basis of the observation of the add and sub functions as two nested unary functions instead of a two-digit function.

The apply function is also successfully typified, i.e. it is recognized that the apply function, as initially described, can be transformed by partial evaluation into a first-order function. It is decisive in this respect that the variable f in the body of the apply function is not used as part of an expression which requires a dynamic type for f. Instead, the definition of the apply function requires the transfer of a static functional variable so that it is ensured that the value of the function f is statically known at the position of the functional application (f a) b (λ convention). It must be taken into account in this respect that it is not the apply function, but rather the foo function which represents the starter function in the program code 1. Otherwise, the apply function would optionally have to satisfy the additional condition that it may not have any static functional variable so that the annotation of the variable f as a static function would result in a type error and consequently in an error message for the user.

EXAMPLE 2

The following program code 5 represents a further program which is checked using the method.

Program code 5:

```
int apply( static ((int,int) => int) f, int a, int b) {
    return f(a,b);
}
int add( int a, int b) { return a + b; }
int sub( int a, int b) { return a - b; }
int main( int a, int b) {
    static ((int,int) => int) f;
    if (true) {
        f = add;
    } else {
        f = sub;
    }
    return apply(f,a,b);
}
```

The definition of the apply function corresponds to the definition of the apply function in the program code 1 or program code 4, where in the program code 5, unlike in the program code 1, it is not only the functional type as the fundamental type which is explicitly annotated for the variable f, but also the static binding time prescribed for functional types. The "main" function is characterized as the starter function by its name. The variables a, b in the apply, add, sub and main functions do not have any explicit binding time annotation. However, a dynamic binding time has to be associated with the variables a and b so that the program can be valid since the starter function may not define a static functional variable.

The following program code 6 gives the program in accordance with program code 5 in the notation of the λ calculus, where the dynamic binding time of the variables a, b has been omitted for reasons of simplicity.

Program code 6:

```
let apply = λf:S(int→S(int→int)). λa:int. λb:int. f (a,b) in
let add = λa:int. λb:int. a+b in
let sub = λa:int. λb:int. a-b in
λa:int. λb:int.
    let f = if true then add else sub in
    apply f a b
```

The notation "let x=$e_1$ in $e_2$" serves for the simpler representation and is equivalent to the notation $(\lambda x:T.e_2)e_1$ with the respectively matching type T of $e_1$, where the type T of $e_1$ is not explicitly annotated, but is rather determined by the type check, i.e. the type T results implicitly from the program and specifically from the type check of the expression $e_1$ provided that the program is valid.

The program in accordance with program codes 5 and 6 can be transformed by partial evaluation into a program without first-class functions. The conditional expression if true then add else sub in program code 6 can namely be evaluated statically to add so that the variable f is statically known at the point of its call within the framework of the apply function. The type check is thus successful and the program is valid. The corresponding type check not shown in detail here comprises the check of the rule T-COND for the conditional expression if true then add else sub. In this respect, at the time of the application of the rule T-COND, a type having a static binding time has already been associated with the expressions add and sub by the rule T-VAR. Since the type S bool and thus a static binding time is also associated with the condition of the above conditional expression, i.e. with the constant "true" in accordance with the rule type(c) given in Table 4, the requirement of the rule T-COND is satisfied that the condition and the two cases of the conditional expression have to have the same binding time so that the rule is applied successfully and the typification continues on.

The successful type check is followed by the partial evaluation of the program For this purpose, all the functional definitions are folded into the body of the starter function main by inlining and the body of the function main is thereby simplified. In addition, the conditional expression is resolved by the partial evaluation. If the variables a, b of the starter function have a dynamic binding time, which is assumed in the present case, and if the target type of the starter function is dynamic, the starter function simplified by the partial evaluation does not contain any further expressions. The partial evaluation results in the equivalent partially evaluated program which is shown in the following as program code 7:

Program code 7:

λa:int. λb:int. a+b

This simplified program can subsequently be converted or translated into a machine code for any desired hardware and can be carried out with a short run time by the respective hardware, independently of whether the hardware supports function pointers or dynamic memory allocation.

EXAMPLE 3

The following example illustrates a type error which occurs when a program having a first-class function cannot be transformed by partial evaluation into an equivalent first-order program.

Program code 8:

```
int bar( bool p, int a) {
    if (p) {
        f = function(int x) { return x; };
    } else {
        f = function(int x) { return 0-x; };
    }
    return f(a);
}
```

The following program code results from this in the λ syntax:

Program code 9:

```
bar = λp:D bool. λa:D int.
    let f = if p
        then λx:D int.x
        else λx:D int. 0 − x
    in f a
```

The binding times not explicitly annotated in program code 8 for the variable p of the fundamental type bool and the variables a, x of the fundamental type int are assumed as dynamic by the method, as is explicitly noted in program code 9.

In a similar manner to the add and sub functions in the above rule application diagram 1, the type check of the expressions λx:D int.x and λx:D int.0-x results after several rule applications in the successful application of the rule T-LAM with the following result:

$$\frac{...}{p:D\ bool,\ a:Dint \vdash \lambda x:Dint.x:S(Dint \to Dint)}(T\text{-}LAM)$$

$$\frac{...}{p:D\ bool,\ a:Dint \vdash \lambda x:Dint.0 - x:S(Dint \to Dint)}(T\text{-}LAM)$$

The type check therefore determines that the functional definitions λx:D int.x und λx:D int.0-x each describe static functions which map a dynamic integer value to a dynamic integer value.

The next higher-ranking expression to these functional definitions is the conditional if-else expression which is to be checked using the rule T-COND. Since a dynamic binding time was associated with the expression p which represents the condition of the conditional expression and since the rule T-COND requires that the condition and the cases of the conditional expression have the same binding time, the successful application of the rule T-COND would have to adopt the following form:

$$\frac{\Gamma \vdash p:D\ bool\quad \Gamma \vdash e_t:DC\quad \Gamma \vdash e_e:DC}{\Gamma \vdash\ \text{if}\ p\ \text{then}\ e_t\ \text{else}\ e_e:DC}(T\text{-}COND)$$

where:
Γ=p:D bool, a:D int
$e_t$=λx:D int.x
$e_e$=λx:D int.0-x

However, it is known due to the application of the rule T-LAM that $\Gamma \vdash e_t:S(D\ int \to D\ int)$, i.e. that the expression $e_t$ has a static binding time. The same applies to $e_e$.

To check whether the rule T-COND can nevertheless be successfully applied, a check is made whether a super-type which allows the application of the rule can be associated with one or more of the expressions p, $e_t$ or $e_e$ by sub-typing. Since the type D bool has no super-type except for itself, it is important whether a suitable super-type can be associated with one of the expressions $e_t$ or $e_e$. For this purpose, a hypothetical super-type DC having a dynamic binding time is assumed which is used in the rule T-SUB so that it results for this following form:

$$\frac{\Gamma \vdash e_t:S(Dint \to Dint)\quad DC:\star\quad S(Dint \to Dint) <:DC}{\Gamma \vdash e_t:DC}(T\text{-}SUB)$$

However, it results from the sub-type rules and in particular from the rule SUB-FUN that no well-formed super-type having a dynamic binding time exists with respect to the type S(D int→D int), i.e. the condition DC:* cannot be satisfied. The rules T-SUB and T-COND can thus not be successfully applied and the conditional if-else expression cannot be successfully typified. It is thereby recognized that the program cannot be transformed into an equivalent first-order program because the function to be applied in the functional application f a depends in a dynamic manner on the dynamic Boolean variable p. In response to this recognition, a corresponding indication is output to the user. The expression of the program is advised to the user in this indication at which the type error occurred, i.e. in the present case the conditional if-else expression, so that the problem can be eliminated simply and directly and the program can be converted into a transformable and thus valid program.

The only FIGURE described in the following shows a flowchart which illustrates a method for checking and for transforming a computer program in accordance with an embodiment of the invention. The round fields each characterize input values or output values of the method and the angular fields characterize method steps carried out using the respective input values or while generating the respective output values.

A program 10 is present in a higher programming language which supports first-class functions. In a method step 12, a type check of the program 10 is carried out to associate a type with each expression which comprises a fundamental type and a binding time of the expression, wherein a functional type only having a static binding time is accepted during the type check.

If the type check is successful, i.e. the program can be completely typified using functional types having a static binding time, the partial evaluation of the program takes place in a further method step 14. If the type check is not successful, an error message 16 is generated and is output to a user, for example via a display device of the computer system carrying out the method, with the error message indicating the cause of the error.

The partial evaluation 14 transforms the program into an equivalent first-order program, i.e. without first-class functions. The partially evaluated program still present on the high-language level is subsequently translated by compiling and assembling in a method step 18 into a destination program 20 for hardware on which the destination program 20 is then preferably directly executed.

REFERENCE NUMERAL LIST 10 computer program
12 type check
14 partial evaluation
16 error message
18 compiling and assembling
20 destination program

The invention claimed is:

1. A method for transforming at least part of a computer program for three-dimensional graphics generation by partial evaluation at compiling time which contains one or more first-class functions, the method comprising:
  carrying out a type check of the part of the program to associate a type of a set of types with each expression in the part of the program, said type comprising a fundamental type and a binding time, the binding time being an evaluation time, the fundamental type selected from a set of fundamental types comprising at least base types for the description of simple values and a functional type for the description of functions and the binding time selected from a set of binding times comprising at least one static binding time and one dynamic binding time, an expression associated with a functional type being only accepted, during the type check, if also associated with the static binding time, an expression associated with a functional type and a dynamic binding time being not accepted, the type check checking whether the part of the program is transformable by eliminating all first-class functions contained in the part of the program by a partial evaluation of the part of the program;
  wherein, when the part of the program is accepted by the type check, eliminating all the first-class functions contained in the part of the program by a partial evaluation of the part of the program, the program transformed by the partial evaluation being translatable into a machine code for execution without dereferencing of at least one of function pointers and dynamic memory allocation, the execution resulting in three-dimensional graphics generation.

2. The method of claim 1, further comprising a step of outputting an error message when it is found during the type check that no type can be associated with an expression.

3. The method of claim 1, further comprising a step of outputting an error message when an expression having a functional type is output as a possible result of a dynamic case distinction.

4. The method of claim 1, further comprising a step of outputting an error message when it is found during the type check that a functional type which has no static binding time is annotated in the program or in the part of the program.

5. The method of claim 1, further comprising a step of defining a linear order on the binding times, wherein the static binding time is smaller than the dynamic binding time.

6. The method of claim 1, further comprising a step of, during the type check, only accepting a type having a functional type as the fundamental type as well-shaped when the functional type reflects a well-shaped target type of the function and reflects a respective well-shaped definition type for the one or more variables of the function and when the type has a static binding time.

7. The method of claim 1, further comprising a step of, during the type check, only accepting a type having a pair type as the fundamental type as well-shaped when the types which describe the elements of the pair are each well-shaped and have binding times which are not smaller than the binding time of the type having the pair type as the fundamental type, wherein the set of fundamental types comprises a set of assembled fundamental types for the description of assembled values which comprises at least one pair type for the description of pair values.

8. The method of claim 1, further comprising a step of, during the type check, associating an expression with a functional type, the expression defining a function having at least one functional variable and which comprises an indication of the type of each functional variable as well as an indication of a body of the function when the reflected type of each functional variable is well-shaped and a type is associated with the body of the function in the context which comprises the context of the expression and the one or more functional variables having the respective reflected types of each functional variable, and the functional type having a static binding time and which reflects the types reflected for the one or more functional variables as definition types of the function and reflects the type associated with the body as the target type of the function.

9. The method of claim 1, further comprising a step of, during the type check, associating an expression with a pair type, the expression defining a pair, with a first element of the pair being reflected by a first subexpression and a second element of the pair being reflected by a second subexpression when a first type is associated with the first subexpression and a second type is associated with the second subexpression, and the pair type having a static binding time and describing the first element of the pair by the first type and the second element of the pair by the second type.

10. The method of claim 1, further comprising a step of defining a respective reflexive and transitive subtype relationship both on the set of types and on the set of the fundamental types, with a first type being accepted as a subtype of a second type when the binding time of the first type is smaller than or equal to the binding time of the second type and when the fundamental type of the first type is a subtype of the fundamental type of the second type.

11. The method of claim 10, further comprising a step of accepting a first functional type as a subtype of a second functional type when each definition type of the second functional type is a subtype of the respective corresponding definition type of the first functional type and a target type of the first functional type is a subtype of a target type of the second functional type.

12. The method of claim 10, further comprising a step of accepting a first pair type as a subtype of a second pair type when the type of the first element of the first pair type is a subtype of the type of the first element of the second pair type and the type of the second element of the first pair type is a subtype of the type of the second element of the second pair type.

13. The method of claim 10, further comprising a step of, during the type check, associating a second type with a conditional expression whose condition is reflected by a first subexpression and whose at least two cases are reflected by a second and a third subexpression when a first type having a Boolean fundamental type and any desired first binding time is associated with the first subexpression and when a respective identical second type having any desired fundamental type and the first binding time is associated with the second and third subexpressions.

14. The method of claim 1, further comprising a step of translating the partially evaluated program into a machine code for a hardware platform which does not offer any support for at least one of function pointers and dynamic memory allocation.

15. A non-transient computer readable medium containing program instructions for causing a computer to perform a method of transforming at least part of a computer program for three-dimensional graphics generation by partial evaluation at compiling time which contains one or more first-class functions, the method comprising the steps of:

carrying out a type check of the part of the program to associate a type of a set of types with each expression in the part of the program, said type comprising a fundamental type and a binding time, the binding time being an evaluation time, the fundamental type selected from a set of fundamental types comprising at least base types for the description of simple values and a functional type for the description of functions and the binding time selected from a set of binding times comprising at least one static binding time and one dynamic binding time, an expression associated with a functional type being only accepted, during the type check, if also associated with the static binding time, an expression associated with a functional type and a dynamic binding time being not accepted, the type check checking whether the part of the program is transformable by eliminating all first-class functions contained in the part of the program by a partial evaluation of the part of the program;

wherein, when the part of the program is accepted by the type check, eliminating all the first-class functions contained in the part of the program by a partial evaluation of the part of the program, the program transformed by the partial evaluation being translatable into a machine code for execution without dereferencing of at least one of function pointers and dynamic memory allocation, the execution resulting in three-dimensional graphics generation.

16. A type system for transforming at least part of a computer program for three-dimensional graphics generation by partial evaluation at compiling time which contains one or more first-class functions, the system comprising:

at least one computer system configured for:

carrying out a type check of the part of the program to associate a type of a set of types with each expression in the part of the program, said type comprising a fundamental type and a binding time, the binding time being an evaluation time, the set of the fundamental type selected from a set of fundamental types comprising at least base types for the description of simple values and a functional type for the description of functions and the set of the binding time selected from a set of binding times comprising at least one static binding time and one dynamic binding time, an expression associated with a functional type being only accepted, during the type check, if also associated with the static binding time, an expression associated with a functional type and a dynamic binding time being not accepted, the type check checking whether the part of the program is transformable by eliminating all first-class functions contained in the part of the program by a partial evaluation of the part of the program;

wherein, when the part of the program is accepted by the type check, eliminating all the first-class functions contained in the part of the program by a partial evaluation of the part of the program, the program transformed by the partial evaluation being translatable into a machine code for execution without dereferencing of at least one of function pointers and dynamic memory allocation, the execution resulting in three-dimensional graphics generation.

\* \* \* \* \*